United States Patent
Hirose

(10) Patent No.: US 12,515,373 B2
(45) Date of Patent: Jan. 6, 2026

(54) WORKPIECE PROCESSING METHOD

(71) Applicant: DISCO CORPORATION, Tokyo (JP)

(72) Inventor: Tsubasa Hirose, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 168 days.

(21) Appl. No.: 18/604,935

(22) Filed: Mar. 14, 2024

(65) Prior Publication Data

US 2024/0316823 A1 Sep. 26, 2024

(30) Foreign Application Priority Data

Mar. 20, 2023 (JP) ................. 2023-043814

(51) Int. Cl.
*B28D 5/00* (2006.01)
*B23K 26/364* (2014.01)

(52) U.S. Cl.
CPC .......... *B28D 5/0011* (2013.01); *B23K 26/364* (2015.10)

(58) Field of Classification Search
CPC ............................ B28D 5/0011; B23K 26/364
See application file for complete search history.

(56) References Cited

U.S. PATENT DOCUMENTS

| | | | | |
|---|---|---|---|---|
| 3,680,213 A | * | 8/1972 | Reichert | B28D 5/0011 33/18.1 |
| 3,965,328 A | * | 6/1976 | Locke | B23K 26/364 219/121.72 |
| 8,610,030 B2 | * | 12/2013 | Oba | B23K 26/0853 219/121.72 |
| 12,289,922 B2 | * | 4/2025 | Iga | H01L 21/3043 |
| 2005/0282359 A1 | * | 12/2005 | Nagai | B23K 26/53 438/464 |
| 2008/0061043 A1 | * | 3/2008 | Fujii | B23K 26/0736 219/121.69 |
| 2012/0198977 A1 | * | 8/2012 | Roick | B23K 3/0638 83/39 |
| 2015/0217400 A1 | * | 8/2015 | Yamada | B23K 26/53 225/2 |
| 2016/0288251 A1 | * | 10/2016 | Hirata | B23K 26/0853 |
| 2017/0053829 A1 | * | 2/2017 | Hirata | H01L 21/0475 |
| 2021/0245304 A1 | * | 8/2021 | Kanezaki | B23K 26/08 |
| 2023/0142363 A1 | * | 5/2023 | Iga | H01L 21/3043 438/113 |
| 2024/0342832 A1 | * | 10/2024 | Hirose | B23K 26/0622 |

FOREIGN PATENT DOCUMENTS

JP 2007275962 A 10/2007

* cited by examiner

*Primary Examiner* — Omar Flores Sanchez
(74) *Attorney, Agent, or Firm* — GREER BURNS & CRAIN, LTD.

(57) ABSTRACT

A workpiece processing method includes a desired shape division start point forming step of applying a laser beam to the workpiece, with a focal point of the laser beam positioned at an outline of a desired shape, to form division start points, an auxiliary division start point forming step of applying the laser beam to the workpiece, with the focal point of the laser beam positioned in a direction of an acute angle from a tangent to the outline of the desired shape, to form auxiliary division start points, a crack forming step of exerting an external force on the auxiliary division start points to generate cracks and propagate the cracks to the division start points formed at the outline of the desired shape, and a step of manufacturing the workpiece in the desired shape from the workpiece by the crack formed at the outline of the desired shape.

7 Claims, 5 Drawing Sheets

WORKPIECE PROCESSING METHOD

BACKGROUND OF THE INVENTION

Field of the Invention

The present invention relates to a workpiece processing method for processing a workpiece into a desired shape.

Description of the Related Art

The present applicant has proposed a technology in which a laser beam is applied to a workpiece such as a silicon wafer to draw curved lines or straight lines on the workpiece, thereby manufacturing a workpiece having a desired shape (see, for example, Japanese Patent Laid-open No. 2007-275962).

SUMMARY OF THE INVENTION

However, there is a problem that, when a laser beam is applied to a workpiece having a comparatively complicate crystal structure, such as a silicon carbide (SiC) wafer, to draw an outline in a desired shape and an external force is exerted to break the outline, cracks would be propagated from the outline into the inside of the desired shape and chipping would occur, so that a workpiece having an appropriate desired shape cannot be manufactured.

Accordingly, it is an object of the present invention to provide a workpiece processing method by which a workpiece having an appropriate desired shape can be manufactured from a workpiece such as a SiC wafer.

In accordance with an aspect of the present invention, there is provided a workpiece processing method for processing a workpiece into a desired shape, the workpiece processing method including a desired shape division start point forming step of applying a laser beam of such a wavelength as to be transmitted through the workpiece to the workpiece, with a focal point of the laser beam positioned at an outline of the desired shape, to form division start points, an auxiliary division start point forming step of applying the laser beam to the workpiece, with the focal point of the laser beam positioned in a direction of an acute angle from a tangent to the outline of the desired shape, to form auxiliary division start points for assisting division, a crack forming step of exerting an external force on the auxiliary division start points to generate cracks and propagate the cracks to the division start points formed at the outline, and a desired shape workpiece manufacturing step of manufacturing the workpiece in the desired shape from the workpiece by the cracks formed at the outline.

Preferably, in the auxiliary division start point forming step, a plurality of sets of the auxiliary division start points are formed around the outline. Preferably, the acute angle is 20 to 60 degrees.

Preferably, in the auxiliary division start point forming step, the auxiliary division start points are formed with a slight interval between the auxiliary division start points and the division start points such that the auxiliary division start points do not communicate with the division start points at the outline. The slight interval may be 5 to 30 μm.

Preferably, the desired shape division start point forming step and the auxiliary division start point forming step are carried out under such a condition that a value obtained by dividing a numerical aperture of a condenser lens for concentrating the laser beam by a refractive index of the workpiece is in a range of 0.05 to 0.2. Preferably, the workpiece is formed of a blank material including SiC, sapphire, quartz, silicon (Si), lithium tantalate (LT), lithium niobate (LN), or amorphous glass.

According to the workpiece processing method of the present invention, the external force is not exerted directly on the outline of the desired shape, so that the desired shape is not damaged. In addition, in the present invention, the auxiliary division start points are formed in a direction of an acute angle relative to a tangent to the outline of the desired shape, so that the cracks can be smoothly propagated from the auxiliary division start points to the division start points of the desired shape. Hence, even from a workpiece having a comparatively complicate crystal structure such as a SiC wafer, a workpiece having an appropriate desired shape can be manufactured by utilizing the cracks formed at the outline of the desired shape.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
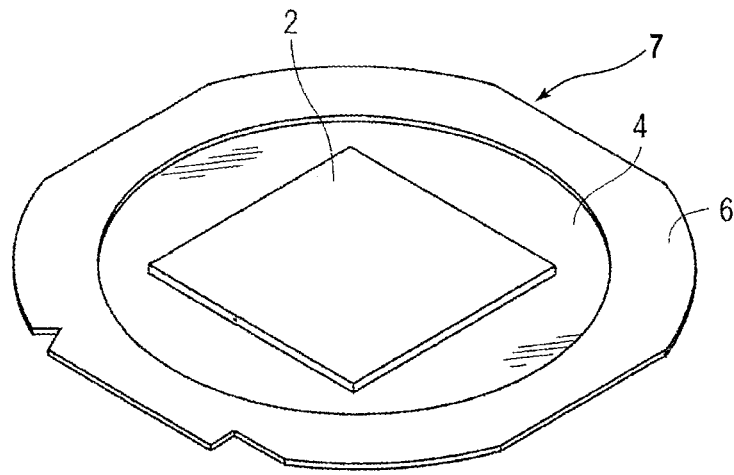
FIG. 1 is a perspective view of a frame unit.

A workpiece processing method according to an embodiment of the present invention will be described below with reference to the drawings. FIG. 1 illustrates a workpiece 2 to be processed by the method according to the present invention. The workpiece 2 can be formed, for example, from a blank material including SiC, sapphire, quartz, Si, LT, LN, or amorphous glass. While the workpiece 2 illustrated is rectangular in shape, the workpiece which can be processed by the method according to the present invention is not limited to the rectangular shape, and may have other shapes such as a circular shape.

The workpiece 2 depicted in FIG. 1 is supported by an annular frame 6 through a dicing tape 4. In other words, the workpiece 2 is stuck to the dicing tape 4 and a peripheral edge of the dicing tape 4 is fixed to the annular frame 6, to constitute a frame unit 7.

In the present embodiment, first carried out is a desired shape division start point forming step in which a laser beam of such a wavelength as to be transmitted through the workpiece 2 is applied to the workpiece 2, with a focal point of the laser beam positioned on an outline of a desired shape, to form division start points.

Figure 2:
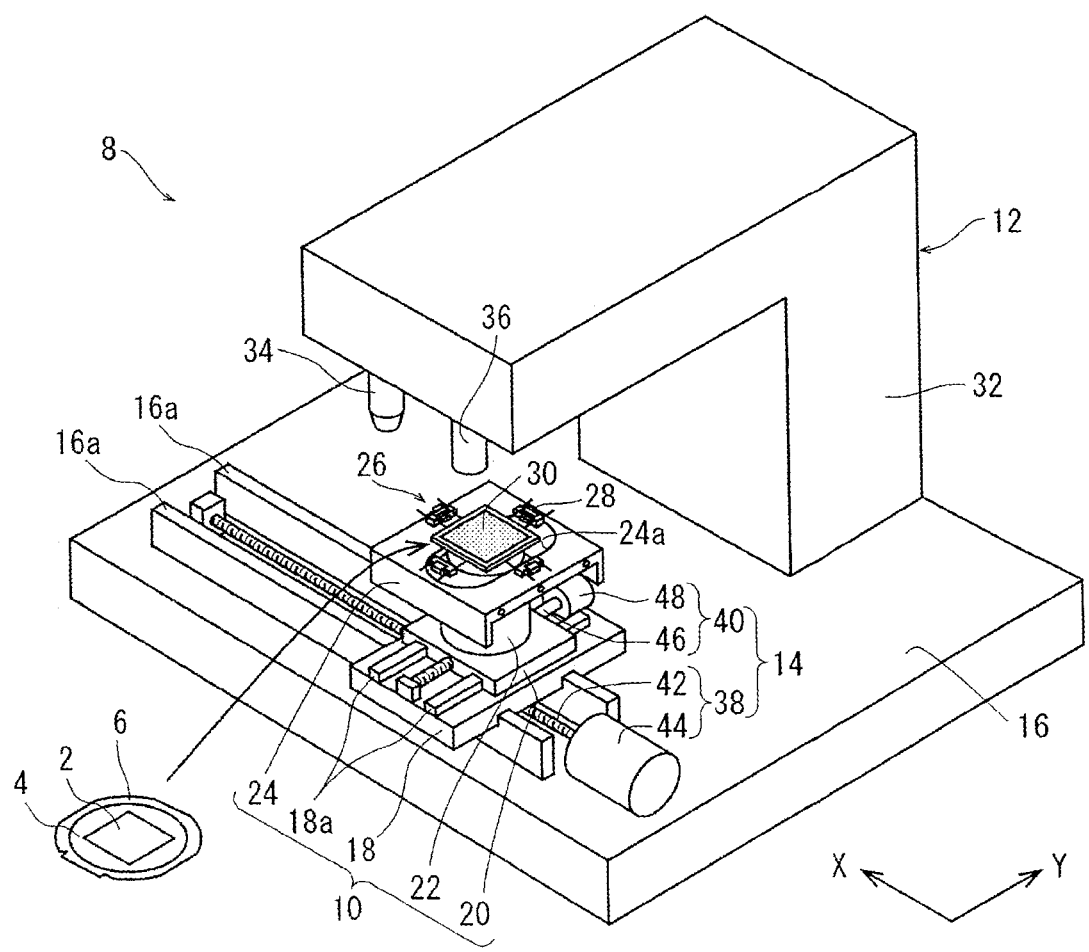
FIG. 2 is a perspective view of a laser processing apparatus.

The desired shape division start point forming step can be carried out, for example, by use of a laser processing apparatus 8 depicted in FIG. 2. The laser processing apparatus 8 includes a holding unit 10 that holds the workpiece 2, a laser beam applying unit 12 that applies a laser beam to the workpiece 2 held by the holding unit 10, and a feeding mechanism 14 that moves the holding unit 10 and the laser beam applying unit 12 relative to each other.

The holding unit 10 includes an X-axis movable plate 18 supported on an upper surface of a base 16 in such a manner as to be movable in an X-axis direction, a Y-axis movable plate 20 supported on an upper surface of the X-axis movable plate 18 in such a manner as to be movable in a Y-axis direction, a support column 22 fixed to an upper surface of the Y-axis movable plate 20, and a cover plate 24 fixed to an upper end of the support column 22.

Nore that the X-axis direction is a direction denoted by an arrow X in FIG. 2, and the Y-axis direction is a direction denoted by an arrow Y in FIG. 2 and is a direction orthogonal to the X-axis direction. An XY plane defined by the X-axis direction and the Y-axis direction is substantially horizontal.

The cover plate 24 is formed with a slot 24a extending in the Y-axis direction, and a chuck table 26 extending upward through the slot 24a is rotatably mounted on the upper end of the support column 22. At a peripheral edge of the chuck table 26, a plurality of clamps 28 for fixing the annular frame 6 are provided.

At an upper end part of the chuck table 26, a porous suction chuck 30 connected to suction means (not illustrated) is disposed. While the suction chuck 30 denoted has a rectangular shape corresponding to the shape of the workpiece 2, the shape of the suction chuck is not limited to the rectangular shape, and may have other shapes such as a circular shape.

In the holding unit 10, a suction force is generated at an upper surface of the suction chuck 30 by the suction means, whereby the workpiece 2 mounted on an upper surface of the chuck table 26 is held under suction. In addition, the chuck table 26 is configured to be rotated by a chuck table motor (not illustrated) incorporated in the support column 22.

The laser beam applying unit 12 includes a housing 32 extending upward from the upper surface of the base 16 and then extending substantially horizontally, a laser oscillator (not illustrated) incorporated in the housing 32, a light concentrator 34 disposed at a lower surface of a tip of the housing 32, and an imaging unit 36 mounted to the lower surface of the tip of the housing 32 in the state of being spaced from the light concentrator 34 in the X-axis direction.

The laser oscillator emits a pulsed laser beam of such a wavelength as to be transmitted through the workpiece 2. The light concentrator 34 concentrates the pulsed laser beam emitted by the laser oscillator and applies the pulsed laser beam to the workpiece 2 held by the holding unit 10. Besides, the imaging unit 36 is configured to image the workpiece 2 held by the holding unit 10.

The feeding mechanism 14 of the present embodiment includes an X-axis feeding mechanism 38 that moves the chuck table 26 in the X-axis direction and a Y-axis feeding mechanism 40 that moves the chuck table 26 in the Y-axis direction.

The X-axis feeding mechanism 38 has a ball screw 42 that is connected to the X-axis movable plate 18 and that extends in the X-axis direction and a motor 44 for rotating the ball screw 42. In the X-axis feeding mechanism 38, the ball screw 42 converts a rotational motion of the motor 44 into a rectilinear motion and transmits the rectilinear motion to the X-axis movable plate 18, to move the X-axis movable plate 18 in the X-axis direction along a pair of guide rails 16a on the base 16. As a result, the chuck table 26 is moved in the X-axis direction.

The Y-axis feeding mechanism 40 has a ball screw 46 that is connected to the Y-axis movable plate 20 and that extends in the Y-axis direction and a motor 48 for rotating the ball screw 46. In the Y-axis feeding mechanism 40, the ball screw 46 converts a rotational motion of the motor 48 into a rectilinear motion and transmits the rectilinear motion to the Y-axis movable plate 20, to move the Y-axis movable plate 20 in the Y-axis direction along a pair of guide rails 18a on the X-axis movable plate 18. As a result, the chuck table 26 is moved in the Y-axis direction.

In the desired shape division start point forming step, first, the workpiece 2 is held under suction by the upper surface of the chuck table 26 by way of the dicing tape 4. In addition, the annular frame 6 is fixed by the clamps 28. Next, the workpiece 2 is imaged by the imaging unit 36, and then, alignment of the workpiece 2 and the light concentrator 34 is performed based on the image of the workpiece 2 obtained by imaging by the imaging unit 36, whereby the focal point of the laser beam is positioned on the outline of the desired shape to be formed.

Figure 3:
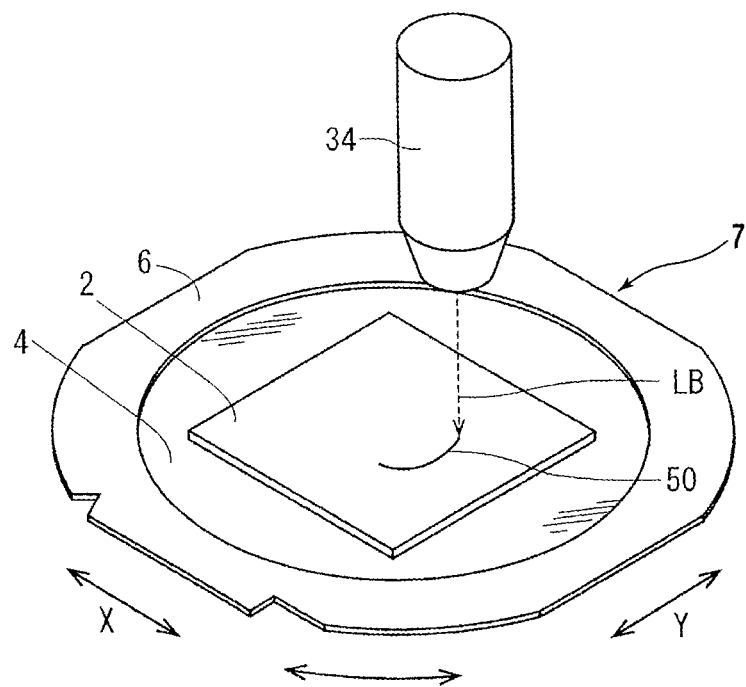
FIG. 3 is a perspective view depicting a desired shape division start point forming step.

Next, as depicted in FIG. 3, while the chuck table 26 is being moved at an appropriate feeding rate by the feeding mechanism 14 and the chuck table motor, a laser beam LB of such a wavelength as to be transmitted through the workpiece 2 is applied from the light concentrator 34 to the workpiece 2. In this instance, the chuck table 26 is moved in such a manner that the locus of the focal point of the laser beam LB matches to the outline of the desired shape.

Figure 4:
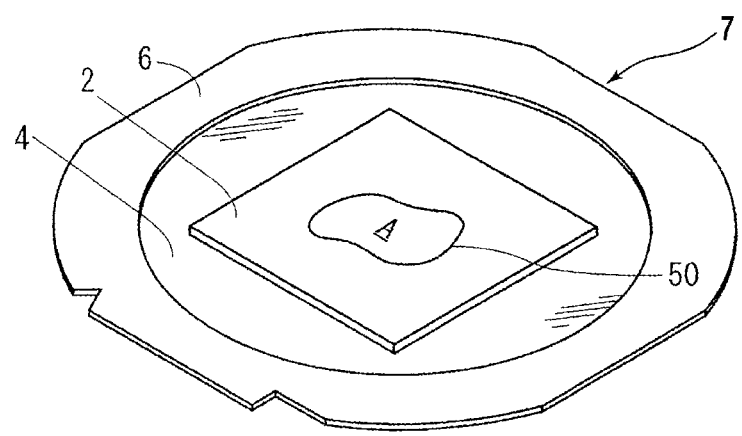
FIG. 4 is a perspective view of the frame unit including a workpiece formed with division start points in a desired shape.

As a result, as depicted in FIG. 4, division start points 50 can be formed along the outline of a desired shape A. While the division start points 50 are formed along the outline of one desired shape A in the present embodiment, the division start points may be formed along outlines of two or more desired shapes.

Figure 5:
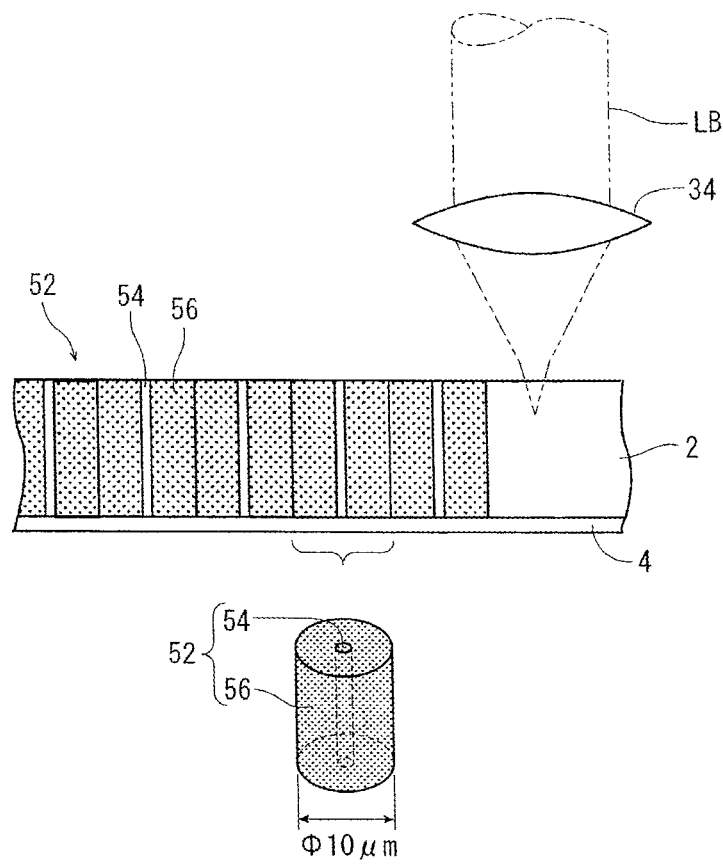
FIG. 5 is a schematic diagram of a shield tunnel which is an example of the division start point.

As an example of the division start points 50, there can be mentioned a multiplicity of shield tunnels 52 depicted in FIG. 5. The shield tunnel 52 includes a fine pore 54 extending from an upper surface to a lower surface of the workpiece 2 and an amorphous region 56 surrounding the fine pore 54. The diameter of the amorphous region 56 formed in the surroundings of the fine pore 54 is, for example, on the order of 10 µm. Note that, in FIG. 5, the light concentrator 34 is schematically depicted in the form of a condenser lens.

In the case of forming the shield tunnels 52 as the division start points 50, the desired shape division start point forming step can be carried out, for example, under the following processing conditions.

Wavelength of pulsed laser beam: 532 nm or 1,064 nm
Repetition frequency: 1 kHz
Average output: 0.3 W
Feeding rate: 10 mm/s In addition, a numerical aperture (NA) of the condenser lens and the wavelength of the laser beam LB in the case of forming the shield tunnels 52 as the division start points 50 can be set as follows according to the blank material of the workpiece 2.

| Blank material of workpiece (Refractive index n) | Numerical aperture (NA) | Wavelength |
|---|---|---|
| SiC (2.65) | 0.133 to 0.53 | 532 nm |
| Sapphire (1.75) | 0.088 to 0.34 | 532 nm |
| Quartz (1.46) | 0.073 to 0.29 | 532 nm |
| LT (2.18) | 0.109 to 0.436 | 532 nm |
| LN (2.2) | 0.17 to 0.44 | 532 nm |
| Single crystal Si (3.35) | 0.168 to 0.67 | 1,064 nm |
| Polycrystalline Si (3.35) | 0.168 to 0.67 | 1,064 nm |
| Amorphous glass (1.51) | 0.075 to 0.302 | 532 nm |

The desired shape division start point forming step is preferably carried out under such a condition that a value S (S=NA/n) obtained by dividing the numerical aperture (NA) of the condenser lens of the light concentrator 34 for concentrating the laser beam LB by the refractive index n of the workpiece 2 is in the range of 0.05 to 0.2 (0.05≤S≤0.2).

Note that, in the desired shape division start point forming step, the laser beam LB of such a wavelength as to be transmitted through the workpiece 2 may be applied to the workpiece 2, with the focal point of the laser beam LB positioned in the inside of the workpiece 2, to thereby form modified layers as the division start points 50.

Performed after the desired shape division start point forming step is carried out is an auxiliary division start point forming step in which the laser beam LB is applied to the workpiece 2, with the focal point of the laser beam LB positioned in a direction of an acute angle from a tangent to the outline of the desired shape A, to form auxiliary division start points for assisting division.

The auxiliary division start point forming step can also be carried out by use of the above-mentioned laser processing apparatus 8. In a case where the auxiliary division start point forming step is also performed by use of the above-mentioned laser processing apparatus 8, the division start points 50 of the desired shape A are formed, and, thereafter, the positional relation between the workpiece 2 and the light concentrator 34 is adjusted, to thereby position the focal point of the laser beam LB at a beginning point of the auxiliary division start points to be formed.

Figure 6:
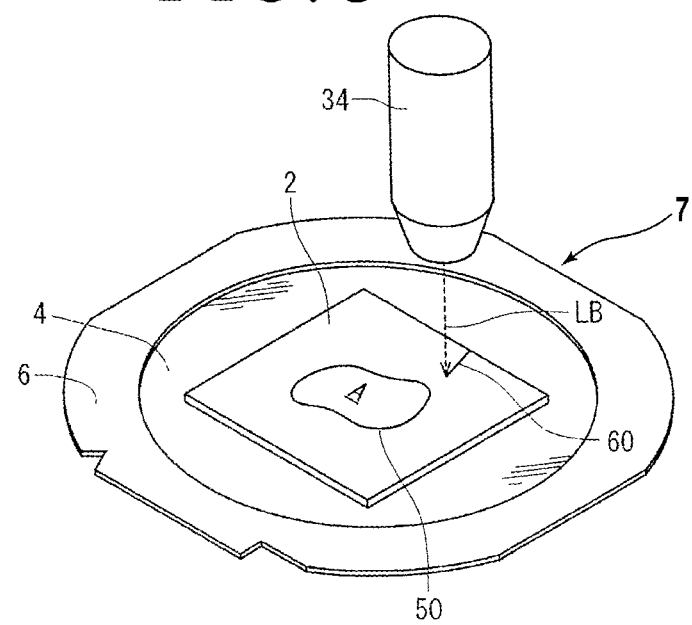
FIG. 6 is a perspective view depicting an auxiliary division start point forming step.

Next, as depicted in FIG. 6, while the chuck table 26 is being moved in such a manner that the locus of the focal point of the laser beam LB becomes rectilinear, the laser beam LB of such a wavelength as to be transmitted through the workpiece 2 is applied from the light concentrator 34 to the workpiece 2. As a result, as depicted in FIG. 7, rectilinear auxiliary division start points 60 that connect a freely-selected point P on the outline of the desired shape A and the circumference of the workpiece 2 can be formed.

At the time of forming the auxiliary division start points 60, as depicted in FIG. 6, the focal point may be relatively moved from the circumference of the workpiece 2 toward the point P on the outline of the desired shape A, or, alternatively, the focal point may be relatively moved from the point P on the outline of the desired shape A toward the circumference of the workpiece 2.

Figure 7:
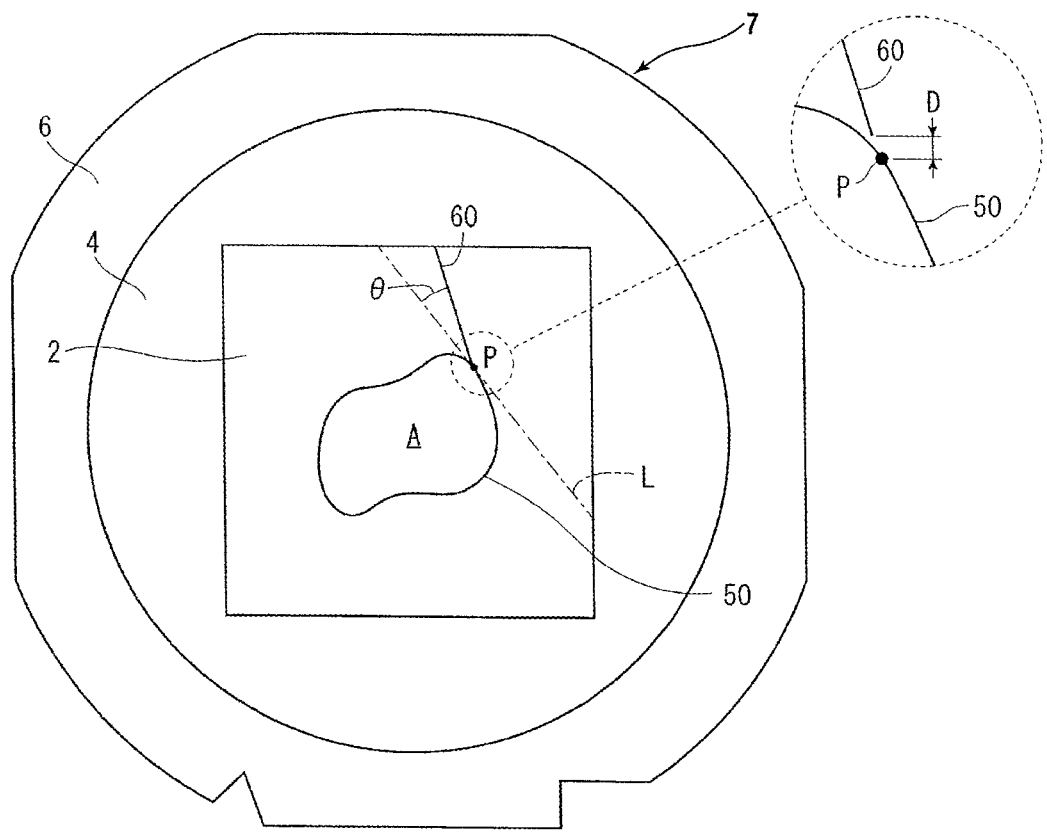
FIG. 7 is a plan view of the frame unit including the workpiece, depicting a relation between the auxiliary division start points and a tangent.
Figure 8:
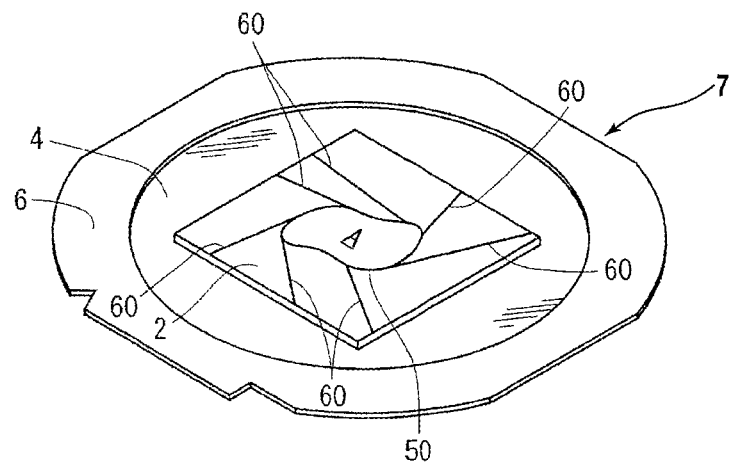
FIG. 8 is a perspective view of the frame unit including the workpiece formed with the auxiliary division start points.

As depicted in FIG. 7, in the auxiliary division start point forming step, the auxiliary division start points 60 are formed in such a manner that an angle θ formed between a tangent L at the point P on the outline of the desired shape A and the auxiliary division start points 60 becomes an acute angle. In other words, the auxiliary division start points 60 are formed in a direction of an acute angle relative to the tangent to the outline of the desired shape A. The acute angle θ is desirably 20 to 60 degrees (20°≤θ≤60°.

As depicted in an enlarged form in FIG. 7, in the auxiliary division start point forming step, the auxiliary division start points 60 are preferably formed with a slight interval D between the auxiliary division start points 60 and the division start points 50 such that the auxiliary division start points 60 do not communicate with the division start points 50 of the outline of the desired shape A. The slight interval D between an end part of the auxiliary division start points 60 and the point P may be 5 to 30 μm (5 μm≤D≤30 μm).

While an example in which one set of auxiliary division start points 60 is formed around the outline of the desired shape A is depicted in FIG. 7, it is preferable that the workpiece 2 be formed with a plurality of sets of auxiliary division start points 60 around the outline of the desired shape A. Also in this case, it is recommendable that each set of auxiliary division start points 60 be formed in such a manner that the angle formed between a tangent to the outline of the desired shape A and the auxiliary division start points 60 becomes an acute angle, with the slight interval D between the auxiliary division start points 60 and the division start points 50 such that the auxiliary division start points 60 do not communicate with the division start points 50 on the outline of the desired shape A.

As such auxiliary division start points 60, the above-described shield tunnels 52 can be formed. Processing conditions in the case of forming the shield tunnels 52 may be the same as the above-described processing conditions. In addition, it is preferable to form the shield tunnels 52 under such a condition that the value S (S=NA/n) obtained by dividing the numerical aperture (NA) of the condenser lens of the light concentrator 34 by the refractive index n of the workpiece 2 is in the range of 0.05 to 0.2 (0.05≤S≤0.2). Note that the auxiliary division start points 60 may be modified layers.

After the auxiliary division start point forming step is carried out, a crack forming step in which an external force is exerted on the auxiliary division start points 60 to generate cracks and propagate the cracks to the division start points 50 formed on the outline of the desired shape A is carried out.

Figure 9A:
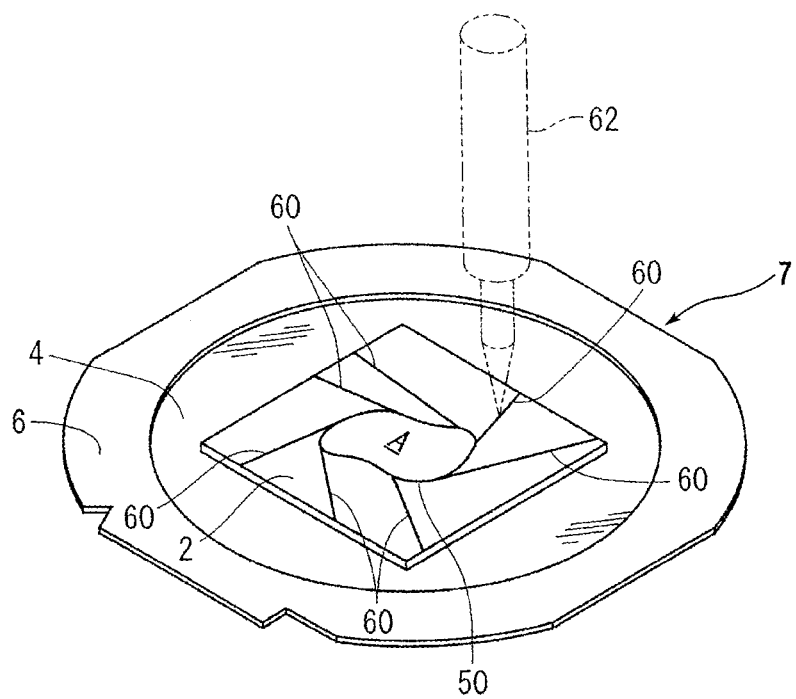
FIG. 9A is a perspective view depicting a workpiece manufacturing step.
Figure 9B:
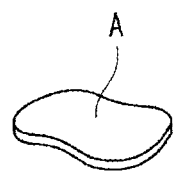
FIG. 9B is a perspective view of the workpiece in a desired shape.

Exertion of the external force on the auxiliary division start points 60 can be performed by use of an automatic punch 62, as depicted in FIG. 9A, for example. A hammer is incorporated in the automatic punch 62. With a tip of the automatic punch 62 placed on the auxiliary division start points 60, the hammer is pushed out with a spring by operating a trigger, whereby an impact force can be transmitted to the auxiliary division start points 60.

By this operation, the external force can be exerted on the auxiliary division start points 60 to generate cracks along the auxiliary division start points 60 and propagate the cracks to the division start points 50 formed on the outline of the desired shape A. By repeating the exertion of the external force on the auxiliary division start points 60 by use of the automatic punch 62, the cracks are formed at the division start points 50 such that the desired shape A can be divided from the workpiece 2. In short, it is sufficient to form the cracks along the whole circumference of the outline of the desired shape A.

In the present embodiment, the external force is not exerted directly on the division start points 50 formed along the outline of the desired shape A, so that cracks are not generated inside the desired shape A, and the desired shape A is not damaged.

As has been described above, in the present embodiment, the auxiliary division start points 60 are formed in such a manner that the angle formed between a tangent to the outline of the desired shape A and the auxiliary division start points 60 becomes an acute angle. Hence, by exerting an external force on the auxiliary division start points 60 by use of the automatic punch 62, the cracks can be smoothly propagated from the auxiliary division start points 60 to the division start points 50 along the desired shape A. In other words, the cracks extending from the auxiliary division start points 60 are propagated along the outline of the desired shape A without straying from the division start points 50.

In addition, in the present embodiment, the auxiliary division start points 60 are formed with the slight interval D between the auxiliary division start points 60 and the division start points 50 such that the auxiliary division start points 60 do not communicate with the division start points 50 formed along the outline of the desired shape A. As a result, extension of the cracks into the inside of the desired shape A can be prevented more effectively.

After the crack forming step is carried out, a desired shape workpiece manufacturing step in which a workpiece in the desired shape A is manufactured from the workpiece 2 by the cracks formed on the outline of the desired shape A is carried out.

As has been described above, in the crack forming step, the cracks are formed on the division start points 50 corresponding to the outline of the desired shape A such that the workpiece in the desired shape A can be divided from the workpiece 2, so that the workpiece in the desired shape A is manufactured through dividing from the workpiece 2 by utilizing the cracks formed at the division start points 50.

As has been described above, in the present embodiment, the external force is not exerted directly on the division start points 50 formed along the outline of the desired shape A, so that the desired shape A is not damaged. In addition, in the present embodiment, the auxiliary division start points 60 are formed in a direction of an acute angle relative to a tangent to the outline of the desired shape A, so that the cracks can be smoothly propagated from the auxiliary division start points 60 to the division start points 50 of the desired shape A. Hence, even from the workpiece having a comparatively complicate crystal structure such as a SiC wafer, the workpiece in an appropriate desired shape A can be manufactured by utilizing the cracks formed on the outline of the desired shape A.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A workpiece processing method for processing a workpiece into a desired shape, the workpiece processing method comprising:
   a desired shape division start point forming step of applying a laser beam of such a wavelength as to be transmitted through the workpiece to the workpiece, with a focal point of the laser beam positioned at an outline of the desired shape, to form division start points;
   an auxiliary division start point forming step of applying the laser beam to the workpiece, with the focal point of the laser beam positioned in a direction of an acute angle from a tangent to the outline of the desired shape, to form auxiliary division start points for assisting division;
   a crack forming step of exerting an external force on the auxiliary division start points to generate cracks and propagate the cracks to the division start points formed at the outline; and
   a desired shape workpiece manufacturing step of manufacturing the workpiece in the desired shape from the workpiece by the cracks formed at the outline.

2. The workpiece processing method according to claim 1, wherein, in the auxiliary division start point forming step, a plurality of sets of the auxiliary division start points are formed around the outline.

3. The workpiece processing method according to claim 1, wherein the acute angle is 20 to 60 degrees.

4. The workpiece processing method according to claim 1, wherein, in the auxiliary division start point forming step, the auxiliary division start points are formed with an interval between the auxiliary division start points and the division start points such that the auxiliary division start points do not communicate with the division start points at the outline.

5. The workpiece processing method according to claim 4, wherein the interval is 5 to 30 μm.

6. The workpiece processing method according to claim 1, wherein the desired shape division start point forming step and the auxiliary division start point forming step are carried out under such a condition that a value obtained by dividing a numerical aperture of a condenser lens for concentrating the laser beam by a refractive index of the workpiece is in a range of 0.05 to 0.2.

7. The workpiece processing method according to claim 1, wherein the workpiece is formed of a blank material selected from a group consisting of silicon carbide, sapphire, quartz, silicon, lithium tantalate, lithium niobate, and amorphous glass.

* * * * *